United States Patent [19]

Killat

[11] 4,442,550
[45] Apr. 10, 1984

[54] DEVICE FOR RECOGNIZING A BINARY WORD

[75] Inventor: Ulrich Killat, Hamburg, Fed. Rep. of Germany

[73] Assignee: U.S. Philips Corporation, New York, N.Y.

[21] Appl. No.: 296,655

[22] Filed: Aug. 27, 1981

[30] Foreign Application Priority Data

Sep. 13, 1980 [DE] Fed. Rep. of Germany ....... 3034640

[51] Int. Cl.$^3$ ............................................. H04B 9/00
[52] U.S. Cl. .................................. 455/608; 375/116;
455/612; 455/619
[58] Field of Search .................. 340/146.3 WD, 146.2;
375/116; 455/608, 603, 610, 612, 619; 382/29, 33, 34

[56] References Cited

U.S. PATENT DOCUMENTS

| | | | |
|---|---|---|---|
| 2,522,609 | 9/1950 | Gloess | 375/116 |
| 3,231,742 | 1/1966 | Siegman | 455/619 |
| 3,818,348 | 6/1974 | Puente | 325/324 |
| 4,062,043 | 12/1977 | Zeidler et al. | 455/612 |
| 4,128,759 | 12/1978 | Hunt et al. | 455/612 |

FOREIGN PATENT DOCUMENTS 885102 8/1953 Fed. Rep. of Germany .

OTHER PUBLICATIONS

"Coherent Optical Generation and Inspection of Two-Dimensional Periodic Structures," H. Damann et al., Optics Acta, vol. 24, No. 4, 1977, pp. 505–515.
Killat et al.–Data Word Recognition in Fiber Optics Systems NTG Fachbor(Germany) vol. 75, 1980.

*Primary Examiner*—Joseph A. Orsino, Jr.
*Attorney, Agent, or Firm*—Marc D. Schechter

[57] ABSTRACT

For recognizing a binary word in a bit stream in the form of light pulses in an optical conductor, the light signals arriving are distributed among a number of optical conductors. The number of conductors is equal to the number of bits of the word to be recognized. The optical conductors have a length which is stepped in unit steps according to the bit distance in the bit stream, so that the delay in each conductor is equal to the time between the bit associated with this light conductor and the last bit of the word. The ends associated with optical conductors of the one bit value are connected to a photodetector. The ends of the other optical conductors are connected to a second photodetector. A differential amplifier determines the difference between the two output signals. When the difference is maximum, the word has been recognized.

10 Claims, 3 Drawing Figures

DEVICE FOR RECOGNIZING A BINARY WORD

BACKGROUND OF THE INVENTION

The invention relates to a device for recognizing a predetermined pulse pattern from a pulse stream. The device comprises delay elements which are chosen so that the delay of a delay element associated with a pulse from the pulse pattern to be recognized corresponds to the relative time distance between the pulse to be delayed and the last pulse of the pulse pattern. The delay elements are each connected at an input end, in parallel, to one end of a conductor for transporting the pulse stream to the delay elements. The device further comprises a coincidence element for detecting time coincident pulses at the output ends of the delay elements.

A device of this kind is known from German Pat. No. 885,102. Due to the specific choice of the delay of the delay elements and the fact that they are connected in parallel to the conductor for transporting the pulse stream, the various pulses of the pulse pattern are simultaneously presented to the output ends of the delay elements. The coincidence element, which is in this case connected to the output ends of delay elements, detects these time coincident pulses, so that the pulse pattern can be recognized. This pulse pattern can be used, for example, for synchronizing a receiver and a transmitter.

A major drawback of the above-described device is its susceptibility to faults. Because the pulses are presented directly to the coincidence element, an interference pulse which is present in the direct vicinity of a pulse of the pulse pattern may be strong enough to trigger the coincidence element. The accuracy of such a device may then be insufficient, notably for processing fast signals.

SUMMARY OF THE INVENTION

It is an object of the invention to provide a device which offers a higher accuracy and which is less susceptible to faults.

To this end, in a device according to the invention the output ends of a first group of delay elements are connected to an input of a first adder. The output ends of a second group of delay elements are connected to an input of a second adder. The first and the second groups of delay elements are mutually exclusive and together represent an assembly of delay elements. The division of the assembly into the first and the second groups is determined on the basis of the bit value of the pulses of the pulse pattern to be recognized. The pulse pattern is composed of a bit pattern having a predetermined sequence of bit values 0 and 1, one bit value representing the absence of a pulse in the time window of the pulse stream and the other bit value representing the presence thereof. An output of the first adder and an output of the second adder are each connected to an input of the coincidence element which comprises a differential amplifier for determining the difference between an output signal of the first adder and an output signal of the second adder.

Because the pulses are discriminated and applied to an adder on the basis of bit value, the first adder will supply, for example, a signal having a maximum on its output and the second adder will supply a signal having a minimum on its output when the pulses correspond to the pattern being sought. When the signal having a minimum is subtracted from the signal having a sharper maximum, a signal having an maximum is obtained. The sharper maximum occurs only upon coincidence of the pulses. Thus, the device can very accurately recognize the pulse pattern.

In a preferred embodiment of a device according to the invention, the pulse stream is a stream of light pulses transported by an optical conductor, the first and the second adder are photosensitive elements, and the delay lines are optical delay lines.

Optical conductors of this kind are advantageous because the information can be transported over them at a very high speed, i.e. with a very high bit rate. Therefore, the binary coded information of a number of message channels can generally be transported via only one optical conductor using time multiplexing in known manner. The light pulses transmitted via one optical conductor are converted into electrical pulses, prior to further processing, by means of photosensitive elements. The electrical pulses are applied to digital circuits for further processing.

When a linear differential amplifier is used in an embodiment according to the invention, the differential amplifier is preferably followed by a threshold switch whose threshold value corresponds to the difference between a first and a second predetermined value. The threshold switch supplies a correspondence signal when the threshold value is exceeded. The reliability of recognition or the permissible deviation from the bit pattern of the binary search word can be readily adjusted by selection of the threshold value.

The distribution of the bit stream received at all optical delay lines simultaneously can be effectively realized by connecting an optical beam splitter to the input ends of all optical delay lines. An optical beam splitter of this kind preferably comprises a phase grating. Such a grating may be designed to obtain a uniform distribution to the input ends of all delay lines.

DESCRIPTION OF THE PREFERRED EMBODIMENTS

The invention will be described with reference to an embodiment which utilizes light pulses for the pulse stream. The invention, however, is by no means restricted to this embodiment.

Figure 1:
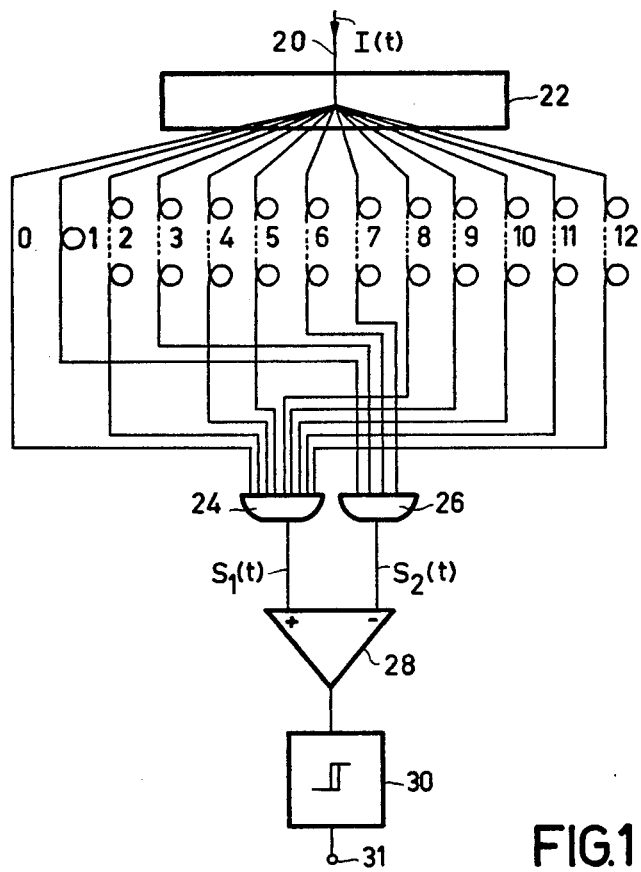
FIG. 1 diagrammatically shows the construction of the complete recognition device according to the invention.

In the device shown in FIG. 1, the bit stream is applied, possibly after regeneration and intensification, to a beam splitter 22 via the optical conductor 20. The bit stream is represented by a sequence of light pulses which succeed one another in the time. A light pulse represents a bit having the value "1", while the absence of a light pulse represents a bit having the value "0".

The beam splitter 22, an embodiment of which is described in detail below, distributes the arriving light pulses simultaneously to the input ends of a number of optical delay lines 0 to 12 (i.e. to 13 optical delay lines), so that each line simultaneously receives a corresponding fraction of the light energy arriving. Thus, it is assumed that the light pulses arriving in the optical conductor 20 have sufficient energy to be split. This can be achieved in a known manner by converting a weak light signal into an electrical signal by means of a photosensitive element, by amplifying the electrical signal, and by activating a light-emitting element with the amplified electrical signal.

The optical delay lines 0 to 12 are assigned to the successively arriving bits of the binary search word. For example, the delay line 12 is assigned to the first bit arriving, while the delay line 0 is assigned to the last bit of the binary search word. The individual delay lines 0 to 12 have different lengths which are chosen so that a light pulse applied to one end of the beam splitter 22 reappears on the output end of a delay line after a delay time which is equal to the time between the binary search word bit assigned to the relevant delay line and the last binary search word bit arriving. The lengths of neighboring delay lines thus differ by an amount which corresponds to the time between two successive bits in the light conductor 20 (i.e. the length of each delay line is an integral multiple of the unit length corresponding of a bit position in the search word). The delay line 0 is subject to the condition that it has a delay time of substantially zero with respect to the distance of successive bits in the optical conductor 20. If this condition cannot be satisfied, the described nominal value of all delay lines 1 to 12 can be increased by the actual length of the delay line 0, so that the delay time of the delay line 0 has no effect.

Figure 2:
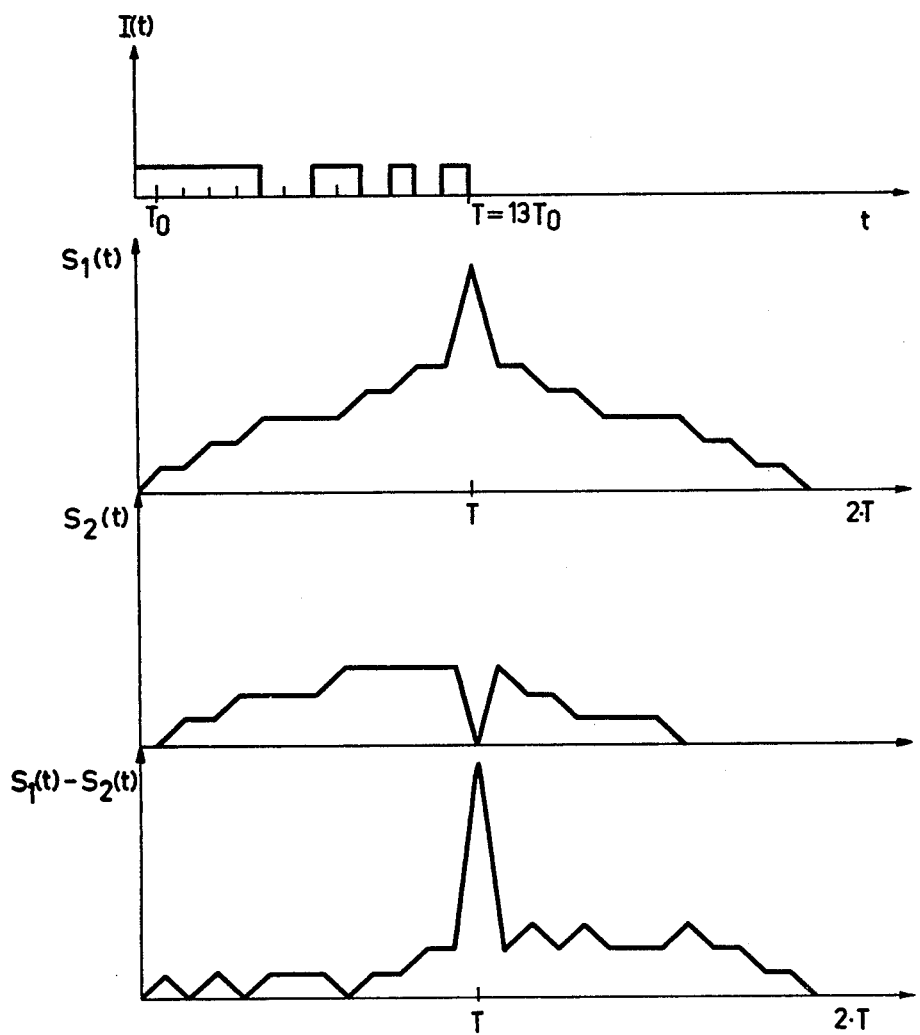
FIG. 2 shows several diagrams of the variation in time of the signals of the device shown in FIG. 1.

The outputs of the delay lines 0 to 12 (which are remote from the beam splitter 22) are fed to one of the photosensitive elements 24 to 26. Which of the delay lines is connected to which of the photosensitive elements is determined by the value of the bit of the binary search word associated with the relevant delay line. The combination of the connections shown in FIG. 1 is based on a search word repesented by the bit stream I(t) which is shown at the top of FIG. 2. Because the time axis extends to the right, the bit adjacent the abscissa axis is the first bit arriving, while the bit terminating at the instant $T = 13\ T_o$ (i.e. 13 bit distances or time elements $T_o$ later) is the last bit arriving.

The first bit arriving is thus assigned to the delay line 12 which is connected to the photosensitive element 24 which is thus assigned the value of this bit. Because the search word initially has five bits of the same value, the delay lines 8 to 12 are all connected to the photosensitive element 24. These bits are followed by two bits of the other value, so that the delay lines 7 and 6 are connected to the photosensitive element 26. Similarly, the other delay lines 5 to 0 are connected to the photosensitive elements 24 and 26.

At the outputs of the photosensitive elements 24 and 26, therefore, signals $S_1(t)$ and $S_2(t)$ are produced. The amplitudes of these signals depend on the number of the delay lines which simultaneously apply a light pulse to the relevant detector. The variations in time of the signals $S_1(t)$ and $S_2(t)$ are shown in the correspndingly denoted diagrams in FIG. 2, it being assumed that only one bit sequence corresponding to the binary search word is applied.

The light pulses which successively arrive in time according to the bit values in the search word independently traverse all delay lines 0 to 12, but appear at their outputs at different instants. The first light pulse appears on the output of the delay line 12 only when the last light pulse corresponding to the last bit of the search word arrives, and the four light pulses following the first light pulse simultaneously appear on the outputs of the delay lines 8 to 11, while no light pulses appear on the outputs of the delay lines 7 and 6. Thus, at the instant T all delay lines connected to the photosensitive element 24 simultaneously supply a light pulse, while the photosensitive element 26 does not receive a light pulse from any of the connected delay lines. Thus, the signal $S_1(t)$ has its maximum value at the instant T, while the signal $S_2(t)$ has its minimum value at this instant.

It can be seen from the corresponding diagrams of FIG. 2 that this maximum in the signal $S_1(t)$ can be recognized. However, it can also be seen that at least the directly adjacent signal values are also comparatively high, so that when a fixed threshold value for the signal $S_1(t)$ is tested for, it is not absolutely certain, considering the tolerance-dependent differences in the energy of the light pulses, that only the exactly correct maximum will be detected.

By combining the two signals $S_1(t)$ and $S_2(t)$, however, an output signal can be recovered which offers an substantially better indication of the occurrence of the search word. Such a combination is for example subtraction. The variation in time of the difference $S_1(t) - S_2(t)$ is shown in FIG. 2. At the instant T, $S_1(t) - S_2(t)$ is at a maximum value which is substantially different from the values at directly adjacent instants. Thus, a threshold value can be chosen which will only be exceeded when the sequence of light pulses is applied according to the bit sequence of the search word. If there is a deviation from this sequence, the difference value will certainly be below the threshold value.

The ratio of the difference value for the volatile bit sequence or light pulse sequence and another arbitrary bit sequence, obviously, depends on the bit sequence in the search word. In the table in the appendix, four examples of bit sequences of search words are given with the ratio of the maximum value to the highest value other than the maximum value for each sequence. If instead of the search word a bit sequence is applied whose bit values are at a number of positions different from the values of the search word, the maximum value will be reduced by a number of units corresponding to the number of positions containing deviating bit values, while the highest values outside the maximum value increase somewhat. As a result, when a threshold value is suitably chosen for example, interference-dependent deviations from the bit sequence of the binary search word can be permitted. A deviation in a location where recognition of the search word is still indicated is highly unlikely to occur because such a deviating bit sequence is extremely unprobable within the normally transported information.

In FIG. 1 the difference between the two signals $S_1(t)$ and $S_2(t)$ is obtained with a differential amplifier 28. The inputs of amplifier 28 receive these signals. To the output of the differential amplifier 28 there is connected a threshold switch 30 which produces a corresponding signal at the output 31 if the output signal of the differential amplifier 28 exceeds the threshold value of the threshold switch 30. The threshold value is defined so that it is reached or exceeded only when the bit sequence of the binary search word or a bit sequence which deviates only slightly therefrom occurs.

Figure 3:
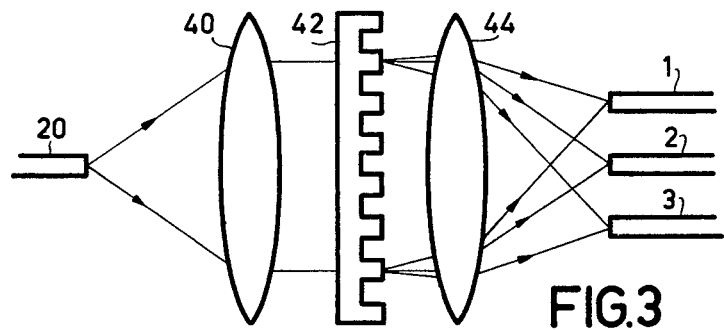
FIG. 3 shows the basic construction of a beam splitter.

FIG. 3 shows an example of the construction of an optical beam splitter. Via a lens 40, the light pulse emerging from the optical conductor 20 is projected onto a binary phase grating which is followed by a further lens 44. Binary phase gratings of this kind, producing a given number of central diffraction orders of the same brightness, are described, for example, in an article entitled "Coherent optical generation and inspection of two-dimensional periodic structures" (H. Damann et al, Optica Acta, Volume 24, 1977, pp. 505 et seq.). The example in FIG. 3 has three diffraction orders so that the light pulse emerging from the light conductor 20 is distributed among three light conductors, for example the delay lines 1, 2 and 3 shown in FIG. 1. The two-dimensional arrangements of light conductors can also be illuminated by the crossing of such one-dimensional grid structures. A compact construction of the beam splitter is thus obtained.

Appendix:
TABLE

| Bit sequence | M/m |
| --- | --- |
| 1010100100010111110110011100001 | 8 |
| 0110101001000101111101100111000 | 8 |
| 1010001010100111011001001111011000 | 5.7 |
| 1110101000100101100111111001001010 | 6 |

What is claimed is:

1. A device for recognizing a predetermined pulse pattern from a pulse stream, said pulse pattern having a predetermined number of pulses and absences of pulses, said device comprising:
   a number of delay elements equal to the number of pulses plus the number of absences of pulses in the predetermined pulse pattern, each delay element being associated with a pulse or absence of a pulse from the pulse pattern to be recognized, the relative time delay of each delay element being equal to the time between the pulse or absence of pulse associated with the delay element and the last pulse or absence of a pulse in the pulse pattern, each of said delay elements having an input and an output;
   a conductor for transporting the pulse stream to the input of each delay element;
   a first adder having inputs and an output, the output of each delay line associated with a pulse from the pulse pattern to be recognized being connected to an input of the first adder;
   a second adder having inputs and an output, the output of each delay line associated with an absence of a pulse from the pulse pattern to be recognized being connected to an input of the second adder; and
   a differential amplifier having inputs and an output, the output of the first adder being connected to one input of the differential amplifier and the output of the second adder being connected to another input of the differential amplifier, the output of the differential amplifier representing the difference between the outputs of the first and second adders.

2. A device as claimed in claim 1, characterized in that:
   the pulse stream is a stream of light pulses;
   the conductor is an optical conductor;
   the adders are photosensitive elements; and
   the delay lines are optical delay lines.

3. A device as claimed in claim 2, characterized in that the device further comprises an optical beam splitter for transporting the pulse stream from the conductor to the input of each delay element.

4. A device as claimed in claim 2, characterized in that the device further comprises a threshold switch having an input and an output, the input being connected to the output of the differential amplifier, the output of the threshold switch producing a correspondence signal when the output of the differential amplifier exceeds a threshold value.

5. A device as claimed in claim 4, characterized in that the device further comprises an optical beam splitter for transporting the pulse stream from the conductor to the input of each delay element.

6. A device as claimed in claim 5, characterized in that the beam splitter comprises at least one phase grating.

7. A device as claimed in claim 3, characterized in that the beam splitter comprises at least one phase grating.

8. A device as claimed in claim 1, characterized in that the device further comprises a threshold switch having an input and an output, the input being connected to the output of the differential amplifier, the output of the threshold switch producing a correspondence signal when the output of the differential amplifier exceeds a threshold value.

9. A device as claimed in claim 8, characterized in that the device further comprises an optical beam splitter for transporting the pulse stream from the conductor to the input of each delay element.

10. The device as claimed in claim 9, characterized in that the beam splitter comprises at least one phase grating.

* * * * *